Patented Jan. 14, 1941

2,228,837

UNITED STATES PATENT OFFICE 2,228,837

PROCESS FOR PRODUCING RESISTANT VARNISH COATINGS ON WOOD

Wilhelm Otto Maisch, Stuttgart, Germany, assignor to the firm Hermann Frenkel, Molkau, near Leipzig, Germany No Drawing. Application February 17, 1938, Serial No. 191,113. In Germany January 5, 1938

2 Claims. (Cl. 91—68)

In U. S. patent application No. 46,209 a process has been described for producing resistant varnish coatings on wood according to which the wood is treated with a varnish consisting of a solution in an organic solvent of a hardenable phenol-formaldehyde artificial resin which has been obtained by alkaline condensation of 1 mol of phenol with at least 1.5 mols of formaldehyde, the resin then being hardened on the wood at temperatures up to 80° C. According to a particular mode of carrying out this known process solutions of alkaline condensed phenol-formaldehyde artificial resins are used which have been neutralised or slightly acidified by an addition of an acid. These phenol-formaldehyde artificial resin varnishes may be dried and hardened in the air at ordinary temperature or if desired after hardening in the air may be after-hardened at temperatures of 40–80° C. According to the known process referred to these varnish coatings may be improved by treating the wood with a pore filler before applying the phenol-formaldehyde artificial resin varnish hardenable at low or ordinary temperature, said pore filler containing phenol-formaldehyde resin hardenable at ordinary temperature as will as fillers and, if desired or necessary, solvents. It is also stated in the specification of the U. S. patent application referred to that solutions of resins, e. g. colophony, shellac, or artificial resins, for example vinyl resins, may be added to the phenol formaldehyde resin varnishes in order to bring about a better flow.

In the specification of U. S. patent application No. 175,174 it is stated that addition of solutions of artificial resins from the urea-aldehyde group to the phenol-formaldehyde resin solutions brings about an improvement in the varnish as regards flow, drying time, stability to light, elasticity, resistivity to the weather and water. The hardening of such varnishes consisting of resin mixtures is likewise effected by addition of acid hardening agents at ordinary temperature or at temperatures up to about 80° C. The addition of the urea-aldehyde resins to the phenol-aldehyde resin is effected in solutions of alcohols, esters or ketones.

It has now been found that the same advantages can be obtained if, instead of adding solutions of a urea-aldehyde resin to the phenol-aldehyde resin varnish, the urea resin is allowed to form simultaneously with the phenol-aldehyde resin. Both resin types are obtained according to the invention in a common condensation process and form a perfectly homogeneous mixture.

In spite of the difference between the specific gravities the two types of resin do not un-mix on storage. The content of urea-aldehyde resin in the resin mixture may amount to 5–50%.

The resin mixture (amino-resol resin) which has been evaporated down and dehydrated is dissolved in alcohols, preferably higher boiling alcohols containing at least three carbon atoms, or esters or ketones. The hardening of such resin mixtures takes place on addition of acid hardening agents at air temperature or at temperatures up to 80° C. If no acid hardening agents are added then the hardening must take place at raised temperature, up to about 80° C.

In the condensation of the urea simultaneously with phenol, a part of the formaldehyde is bound by the urea, at least 1.5 mols of formaldehyde, however, remaining over for 1 mol of phenol.

*Example*

Ten parts by weight of phenol, 3 parts by weight of urea, 45 parts by weight of formaldehyde (30% by weight) and 0.5 part by weight of sodium bicarbonate are heated under a reflux condenser. After boiling for twenty minutes the solution is evaporated down in vacuum until it is a viscous liquid and thereupon the evaporated resin is brought into solution in an equal weight of alcohol.

This resin solution may already be used as a varnish for coating wood; the hardening is effected at temperatures up to 80° C. If the hardening is to be effected at air temperature than the resin solution must be slightly acidified; an alcoholic hydrochloric acid solution is preferably used for this purpose. The salts which may separate out as a result of the acidification may be removed by filtration. An extremely waterproof, scratch-resisting, knock-proof and light resisting varnish coating on wood is obtained.

Instead of urea its derivatives such as thiourea may be used. In place of phenol an equivalent quantity of cresol may be used. In place of sodium bicarbonate an equivalent quantity of some other inorganic or organic base, for instance sodium hydroxide, potassium hydroxide, dimethylamine, may be used. As alcohol ethyl-alcohol, butylalcohol or another higher boiling alcohol may be used.

What I claim is:

1. A process for preparing resistant varnish coatings on wood consisting in applying to the wood a solution in an organic solvent of an acid hardening agent and of a hardenable artificial resin mixture obtained by condensing together ten parts by weight of phenol, three parts by weight of urea, forty-five parts by weight of formaldehyde (30% by weight) and 0.5 part by weight of sodium bicarbonate, and hardening the resin mixture in the air at normal temperature.

2. A process for preparing resistant varnish coatings on wood consisting in applying to the wood a solution in an organic solvent of an acid hardening agent and of a hardenable resin mixture obtained by simultaneously condensing phenol and urea with an aldehyde under alkaline conditions in a relation that 1 mol of phenol is condensed with at least 1.5 mols of an aldehyde and that the urea content is sufficient to produce urea resin amounting to from 5 to 50% of the resin mixture, and hardening the resin coating in the air at normal temperature.

WILHELM OTTO MAISCH.